Aug. 29, 1961     O. ENGELHARD     2,997,867
PATTERN CHAIN FOR WARP KNITTING MACHINES
Filed Oct. 8, 1958
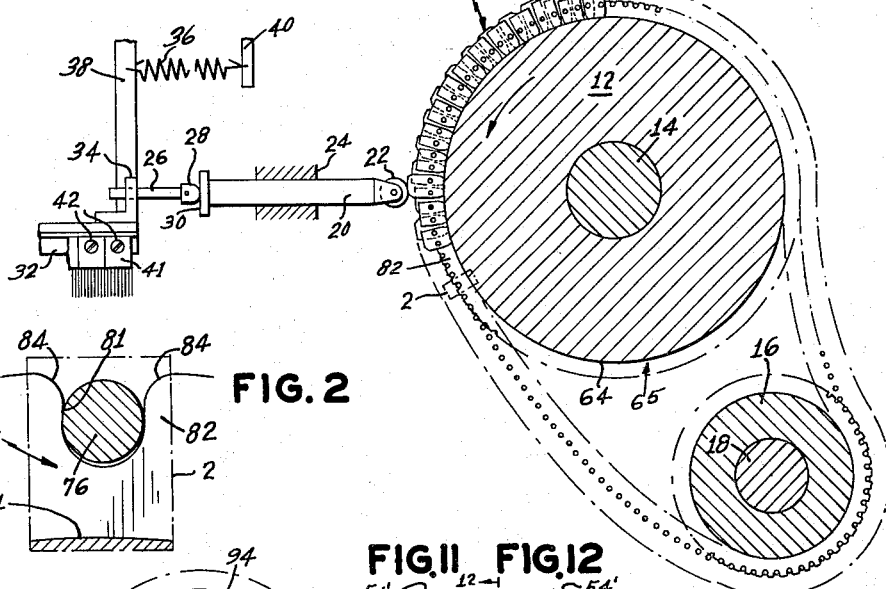
INVENTOR.
*Otto Engelhard*
BY
ATTORNEYS United States Patent Office 2,997,867
Patented Aug. 29, 1961

2,997,867
PATTERN CHAIN FOR WARP KNITTING MACHINES
Otto Engelhard, Forest Hills, N.Y., assignor to Native Laces & Textiles, Inc., New York, N.Y., a corporation of New York
Filed Oct. 8, 1958, Ser. No. 766,134
5 Claims. (Cl. 66—156)

This invention relates to pattern chains and more particularly to pattern chains for warp knitting machines.

Pattern chains are made up of links which provide a succession of cam surfaces to actuate a follower which rides on the cam surfaces of the chain as the chain passes around and is driven by a pattern wheel. By changing the links on the chain any predetermined pattern may be effected. One form of such a chain comprises a succession of links, each link consisting of a tongue projecting centrally forward from a part which is U-shaped, the arms of the U serving as a fork to embrace the corresponding tongue on the succeeding link. The links are connected to each other by a pin passing through holes in the arms of the fork of one link and the tongue on the succeeding link. The undersurface or lower edge portion of all the links is curved so as to fit the curvature of the pattern wheel and abut the bottom surface of the grooves provided therein. The grooves have circumferentially extending flange portions which are provided with slots which engage the connecting pins of the links to drive the pattern chain. The cam effect of the pattern chain is obtained by varying the height of each link.

Since the connection between each of the prior links comprises a tongue and fork assembly the manufacture of each link is necessarily expensive because of the milling operations required to form the tongue and fork of the link. Pursuant to the present invention the tongue and fork connections of the prior links have been eliminated resulting in a considerable reduction of manufacturing costs.

The upper edge portion of each of the prior links is provided with sloping parts or chamfers at one or both ends thereof to permit the follower to ascend or descend gradually from one link to the other. Accordingly, for any particular height of link there may be as many as four links each having different chamfered portions thereon which will permit the required movement of the follower. Because of the tongue and fork connection between the links the links are non-reversible so that for any particular height of link one link must be provided with an ascending chamfer thereon to permit the follower to rise from a lower link to a higher link and another link of the same height must be provided having descending chamfered portions thereon to permit a follower to descend from a higher link to a lower link. By eliminating the tongue and fork connection between the links, the links pursuant to the present invention may be made reversible so that only one link instead of the previously required two is needed to permit a follower to rise or descend from any link of a particular height.

Each of the prior links is provided with an upper edge portion comprising an arcuate cam surface on which the follower rides and a lower edge portion which is also arcuate and engages the circumferential grooves of the pattern wheel. Pursuant to a modified embodiment of the invention, by providing a link having straight flat upper and lower edge portions the previously required pattern wheel has been eliminated as well as the necessary manufacturing expense required to provide the curved edge portions on the link.

With complicated patterns the pattern chain is necessarily long requiring numerous idler wheels to support the chain. To conserve the space occupied by the pattern chains the chain is looped or "back-bent" so the various lengths forming the loops of the chain will be close to each other. However, because of the tongue and fork connection between the links the forked ends of one link abut the shoulders of a succeeding link during "back-bending," preventing the lengths of chain of each loop from being close to each other resulting in large spaces being occupied by the pattern chain. By eliminating the tongue and fork connection in the chain of the present invention the space required for "back-bending" has been substantially reduced and the idler wheels may be made smaller. In addition, because of the elimination of the tongue and fork connection the width of each link of the pattern chain of the present invention has been reduced about ⅓ thereby resulting in shorter idler wheels and pattern wheels. In addition, the expense of grinding the chamfered corners on the upper edge portion of each of the links has been reduced since there is less material to be removed.

With coarse gage warp knitting machines the links forming the pattern chain are comparatively high. High links have been found to be unstable and tilt because a relatively short part of the lower portion of each of the links is supported by the circumferentially extending flange portions provided on the pattern wheel. In the links of the present invention high links are provided with elongated portions extending below the connecting pins for the links which stabilize the links and prevent tilting thereof during the operation of the pattern chain.

One object of the present invention is to provide an improved pattern chain and links therefor which will overcome the difficulties enumerated above.

Another object of the present invention is to provide a pattern chain comprised of links having flat parallel sides to permit adjacent links to be connected to each other in overlapping side-by-side relation.

A further object of the present invention is to provide an improved connection between succeeding links of a pattern chain devoid of any tongues or grooves or forked ends.

Still another object of the present invention is to provide a pattern chain having improved "back-bending" characteristics.

A further object of the present invention is to provide a pattern chain comprised of links which are reversible.

Yet another object of the invention is to provide an improved link for a pattern chain having means for preventing tilting of the links during the operation of the pattern chain.

A further object of the invention is to provide a link that is thinner and lighter than previous links heretofore known.

A still further object of the invention is to provide a pattern chain that may be operated without a pattern wheel.

Yet another object of the invention is to provide an improved link for a pattern chain that is simpler and cheaper to manufacture than links for pattern chains heretofore known.

A further object of the present invention is to provide a pattern chain that requires fewer links for any particular height of a link than pattern chains heretofore known.

The above and other objects, features and advantages of the present invention will be fully understood from the following description considered in connection with the accompanying drawings which are illustrative of the presently preferred mode of practicing this invention.

In the drawings:

FIG. 1 is a vertical view of a part of a warp knitting machine and a complete pattern chain made up of links according to the present invention;

FIG. 2 is a fragmentary view, on an enlarged scale, of a portion of the pattern wheel indicated at 2 in FIG. 1;

FIG. 3 is a vertical view, on an enlarged scale, of a section of the pattern chain shown in FIG. 1;

FIG. 4 is a plan view taken on the line 4—4 of FIG. 3;

FIG. 5 is a front elevational view of a link of the pattern chain shown in FIG. 3 and on the same scale as FIG. 3;

FIG. 6 is a side elevational view taken on the line 6—6 of FIG. 5;

FIG. 7 is a front elevational view of a modified link of the pattern chain of FIG. 3 and on the same scale as FIG. 3;

FIG. 8 is a side elevational view taken on the line 8—8 of FIG. 7;

FIG. 9 is a vertical view of a modified form of a pattern chain according to the present invention on a larger scale than FIG. 1;

FIG. 10 is a fragmentary view, on an enlarged scale, taken on the line 10—10 of FIG. 9;

FIG. 11 is a front elevational view, on an enlarged scale, of a link of the pattern chain shown in FIG. 9; and FIG. 12 is a side elevational view taken on the line 12—12 of FIG. 11.

Referring now to the drawings in detail and particularly to FIG. 1, there is shown a pattern chain 10, according to the present invention, mounted on a pattern wheel 12 and being driven thereby. The pattern wheel 12 is suitably keyed to a shaft 14 which is driven by suitable means, not shown, to drive pattern wheel 12 in the direction indicated. The lower end of pattern chain 10 is supported and mounted on idler wheel 16 which is mounted on shaft 18, which is suitably supported in bearings not shown. It will be understood that with complicated patterns the length of the pattern chain is greatly increased so that additional idler wheels may be required upon which the chain may be looped during "back-bending" of the chain. A follower arm 20 having a roller 22 mounted at one end thereof is suitably supported in bearing member 24 for sliding movement thereon. A follower member 26 having an enlarged head portion 28 is biased for engagement with bearing surface 30 of follower arm 20, follower member 26 being adapted to slide on bearing surface 30 as the yarn guide bar 32 of a warp knitting machine is caused to oscillate in a manner well known to those skilled in the art. Follower member 26 is mounted on yarn guide bar 32 by a suitable bracket 34, the yarn guide bar and the follower member 26 being biased toward the pattern chain 10 by tension spring 36 which is fastened to member 38 on the yarn guide bar and a suitable stationary support 40 such as the frame of the warp knitting machine. Yarn guide leads 41 are suitably fastened to the yarn guide bar by securing means 42.

From the foregoing, it will be seen that as the pattern wheel 12 is caused to rotate counterclockwise as seen in FIG. 1 the links of the pattern chain will actuate follower arm 20 imparting motion to yarn guide bar 32 in accordance with the predetermined pattern provided by the assemblage of the links of the pattern chain 10. Since the links are used to actuate follower arm 20, they are non-flexible and are of substantial thickness as shown so as to be able to transmit a relatively heavy force to the follower for the actuation thereof.

Referring now to FIGS. 3 and 4, there is disclosed an enlarged view of a section of the pattern chain 10. Pattern chain 10 comprises a plurality of links, such as links 44, 46, and 48, each link being of different height h, arranged in overlapping side-by-side relation to effect the predetermined movement of follower arm 20. As best seen in FIGS. 5 and 6, each link is provided with flat parallel sides 50 and 52, respectively, an upper edge portion 54 comprising an arcuate cam surface 56 and chamfered corners 58 and 60 at each end thereof, and an arcuate lower edge portion 62. As is well known to those skilled in the art chamfered corners 58 and 60 function to permit the follower arm 20 to ascend from a lower link, such as link 44 as seen in FIG. 3, to a higher link such as link 46, and also permits the follower arm 20 to descend from a high link, such as link 46, to a lower link such as 48. Lower edge portion 62 is curved to conform with the curvature of the bottom surface 64 (FIG. 1) of the circumferential grooves 65 provided on the surface of the pattern wheel 12, so that each link of the pattern chain is in abutting relation with said surface as is well known to those skilled in the art. Each link is provided with two openings or holes therethrough, 66 and 68, respectively, which are equally spaced from their respective ends 70 and 72 and symmetrically spaced on the link. Each link is provided with an elongated portion 74 which extends below openings 66 and 68. The respective ends of elongated portions 74 may be chamfered as at 78 and 80 to prevent alternate links such as links 44 and 48 (FIGS. 3 and 4) from engaging each other at the elongated portions thereof as the pattern chain 10 moves around pattern wheel 12. Succeeding links, such as links 44 and 46, are pivotally connected to each other in overlapping side-by-side relation by pivot pins 76 which pass through openings 66 and 68 in each of their respective links as best seen in FIG. 4. Snap rings 79 may be provided for retaining the pins in their respective holes. It will be noted in FIG. 4 that in the assembled condition of the links to form the pattern chain, pin 76 will pass through the superimposed opening 68 of one link and opening 66 of the succeeding link to form a pivoted connection between said links at the portions of the overlapping abutting sides of successive links. It will also be noted that pins 76 extend outwardly from both sides of the connected links to engage slots 81 circumferentially spaced around the flanges 82 which project upwardly from the bottom surface 64 of groove 65 provided in the pattern wheel 12, as best seen in FIGS. 1 and 2. As is well known to those skilled in the art the pattern chain is driven by the engagement of the slots 81 with the pivot pins 76 so that the pins 76 enter and leave the slots 81 as the chain passes over the pattern wheel 12. To effect easy movement of the pins 76 into and out of the slots 81 the corners 84 of the slots are provided with large radii.

It will be noted particularly from FIG. 4 that since the sides of each of the links are flat and parallel and that the openings 66 and 68 are equally and symmetrically spaced with respect to the ends 70 and 72, respectively, of each of the links, each link is reversible and may be assembled to the succeeding link with either side 50 or 52 in abutting relation therewith. This makes possible the use of one link to permit a follower to descend or ascend depending upon the position of the link. In one position of the link the chamfered corner 58 will permit a follower to rise from a low link to a succeeding high link and in reversed position the chamfer 58 will permit a follower to descend from a high link to the succeeding low link. It will also be noted from FIG. 4 that succeeding links, such as links 44 and 46, are disposed laterally of each other and in abutting relation with portions of the sides of said links so that during "back-bending" of the links the ends 72 of one link and the end 70 of the succeeding link do not engage each other and thereby prevent interference of succeeding links with each other during "back-bending."

FIGS. 7 and 8 show a modified form of the link pursuant to the present invention wherein the link is similar in configuration to the link shown in FIGS. 5 and 6 except that the elongated portion 74 of the link of FIGS. 5 and 6 has been substantially reduced to form a shorter lower portion 74'. The chambers 78 and 80 of the link have been eliminated since alternate links of the assembled chain will not engage each other at the lower portions thereof as the links of FIGS. 5 and 6.

The links of FIGS. 5 and 6 are used in coarse gage warp knitting machines wherein the relative height of each link is substantial. Because of the height of the link the link tends to be unstable and would tilt while it is in the grooves 65 of the pattern wheel were it not for the elongated portion 74 which extends into grooves that are deeper than the grooves that were heretofore provided in pattern wheels. The links of FIGS. 7 and 8 are used with fine gage warp knitting machines wherein the links are relatively short and do not tend to be unstable even in the relatively shallow grooves that are provided in the pattern wheels.

Referring now to FIG. 9 there is disclosed a modified embodiment of the pattern chain pursuant to the present invention. In this modified embodiment the use of a pattern wheel has been eliminated by providing a link with upper and lower edge portions which are straight and flat. The modified form of the pattern chain 10' is mounted on and actuated by a sprocket drive which comprises a driver wheel 86 and a follower wheel 88. Driver 86 is suitably mounted on a shaft 90 which is driven by means not shown in the direction indicated in FIG. 9. Follower 88 is mounted on a shaft 92 which is also suitably supported by means not shown. Driver wheel 86 and follower wheel 88 are similar in construction and are provided with flanges 94 having the usual slots 81, similar to pattern wheel 12, for driving the pattern chain 10' by engagement of the pins 76 in the slots 81. A guide member 96 is suitably supported by means not shown and has, as best seen in FIG. 10, a groove 97 formed by upstanding flange portions 98 and a bottom surface 100 which engages and supports the links of the pattern chain 10' at the lower portions thereof, the straight flat lower edge portion 62' of the modified link abutting the bottom surface 100 of groove 97. As best seen in FIGS. 11 and 12 the link of the modified pattern chain 10' is identical to the link disclosed in FIGS. 5 and 6 except that the upper and lower edge portions thereof, 54' and 62', respectively, are straight and flat instead of curved. From the foregoing it will be seen from FIG. 9 that as the pattern chain 10' is driven by sprocket wheel 86 in the direction shown the links of the chain will successively pass through groove 97 of guide member 96 wherein follower arm 20 will be actuated for movement according to the predetermined pattern of the assembled chain. In this regard it will be noted that any play in the chain is restricted to the length of the chain engagement between the driver wheel 86 and the follower wheel 88 since the connecting pins 76 of the chain engage the slots 81 in each of the wheels. It will be understood that with the embodiment of the invention shown in FIG. 9, with fine gage warp knitting machines a link similar to the link shown in FIGS. 7 and 8 will be provided having straight flat upper and lower edge portions in lieu of the arcuate upper and lower edge portions 54 and 62.

While I have shown and described the presently preferred embodiments of the invention it will be understood that the invention may be embodied otherwise than as herein specifically illustrated and described and that in the illustrated embodiments certain changes in the details of construction and in the form and arrangement of parts may be made without departing from the underlying idea or principles of the invention. Accordingly, I do not wish to be limited to the precise construction shown or described herein, except as may be required by the scope of the appended claims.

Having thus described my invention, what I claim and desire to secure by Letters Patent, is:

1. A pattern chain for directly imparting a predetermined movement to a yarn guide bar of a warp knitting machine, comprising a plurality of links, each of said links having flat parallel sides for connecting succeeding links to each other in overlapping side-by-side relation, and means connecting said links to each other in overlapping side-by-side relation to form said pattern chain comprising openings extending through said links proximate both ends thereof, said openings through succeeding links being in superimposed relation to each other in the assembled chain, and pin means passing through said superimposed openings of said succeeding links to connect said succeeding links to each other, each of said links having a lower edge adapted for engagement against a member, each of said links having elongated portions extending between said connecting pin means and said lower edge for stabilizing said links to prevent said links from tilting during the operation of said pattern chain.

2. A link for a pattern chain for directly imparting a predetermined movement to a yarn guide bar of a warp knitting machine, comprising a member having flat parallel sides whereby succeeding links in said pattern chain are adapted to be connected to each other in overlapping side-by-side relation, an upper edge portion comprising a cam surface for controlling the movement of a follower, a lower edge portion for engagement with a pattern wheel, and means in said member for pivotally connecting said link to a succeeding link in overlapping side-by-side relation therewith comprising openings extending through said member at both ends thereof for receiving connecting means for said links, and an elongated portion extending between said openings and said lower edge portion for stabilizing said link to prevent said link from tilting during the operation of said pattern chain.

3. A pattern chain for directly imparting a predetermined movement to a yarn guide bar of a warp knitting machine, comprising a plurality of links, each of said links having flat parallel sides for connecting succeeding links to each other in overlapping side-by-side relation, and means connecting said links to each other in overlapping side-by-side relation to form said pattern chain comprising openings extending through said links proximate both ends thereof, said openings through succeeding links being in superimposed relation to each other in the assembled chain, and pin means passing through said superimposed openings of said succeeding links to connect said succeeding links to each other, each of said links having elongated portions extending below said connecting pin means for stabilizing said links to prevent said links from tilting during the operation of said pattern chain, each of said links having chamfered corners at the lower part of said elongated portions to prevent alternate links of said chain from engaging each other at said elongated portions thereof during the actuation of said chain, alternate links of said chain being disposed in the same plane and succeeding links of said chain being disposed in parallel planes.

4. A link for a pattern chain for directly imparting a predetermined movement to a yarn guide bar of a warp knitting machine, comprising a member having flat parallel sides whereby succeeding links in said pattern chain are adapted to be connected to each other in overlapping side-by-side relation, an upper edge portion comprising a cam surface for controlling the movement of a follower, and means in said member for pivotally connecting said link to a succeeding link in overlapping side-by-side relation therewith comprising openings extending through said member at both ends thereof for receiving connecting means for said links, and an elongated portion extending below said openings for stabilizing said link to prevent said link from tilting during the operation of said pattern chain, said link having chamfered corners at the lower part of said elongated portion to prevent alternate links when assembled in said chain from engaging each other at said elongated portions thereof during the actuation of said chain.

5. A pattern chain for directly imparting a predetermined movement to a yarn guide bar of a warp knitting machine, comprising a plurality of links, each of said links having flat parallel sides for connecting succeeding link to each other in overlapping side-by-side relation, and means connecting said links to each other in overlapping side-by-side relation to form said pattern chain comprising openings extending through said links proximate both ends thereof, said openings through succeeding links being in superimposed relation to each other in the assembled chain, and pin means passing through said superimposed openings of said succeeding links to connect said succeeding links to each other, each of said links having elongated portions extending below said connecting pin means for stabilizing said links to prevent said links from tilting during the operation of said pattern chain, each of said links having chamfered corners at the lower part of said elongated portions to prevent alternate links of said chain from engaging each other at said elongated portions thereof during the actuation of said chain, alternate links of said chain being disposed in the same plane and succeeding links of said chain being disposed in parallel planes, each of said links being non-flexible and of substantial thickness so as to be able to transmit a relatively heavy force to a follower for the actuation thereof, said pin means having portions extending from the sides of each link and engageable with driving means for operating said pattern chain.

References Cited in the file of this patent

UNITED STATES PATENTS

| | | |
|---|---|---|
| Re. 15,901 | Springthorpe | Aug. 26, 1924 |
| 874,074 | Houseman | Dec. 17, 1907 |
| 2,229,692 | Crimmins | Jan. 28, 1941 |
| 2,741,107 | Garner et al. | Apr. 10, 1956 |
| 2,881,606 | Lanthier | Apr. 14, 1959 |
| 2,888,815 | Jacoby et al. | June 2, 1959 |